United States Patent [19]

Preston, Jr.

[11] 4,202,865
[45] May 13, 1980

[54] ON-LINE REGENERATION OF HYDRODESULFURIZATION CATALYST

[75] Inventor: John L. Preston, Jr., Hebron, Conn.

[73] Assignee: United Technologies Corporation, Hartford, Conn.

[21] Appl. No.: 956,300

[22] Filed: Oct. 30, 1978

[51] Int. Cl.² .................... B01J 8/00; C10G 23/02
[52] U.S. Cl. .................... 423/244; 423/651; 208/216 R; 252/419
[58] Field of Search .................... 208/213, 216 R; 423/651, 244 R, 244 A; 252/419

[56] References Cited

U.S. PATENT DOCUMENTS

| 2,631,921 | 3/1953 | Odell | 208/213 |
| 3,413,214 | 11/1968 | Galbreath | 208/216 |
| 3,519,573 | 7/1970 | Coe | 252/419 |
| 4,123,507 | 10/1978 | Hass | 423/244 A |

Primary Examiner—George J. Crasanakis
Attorney, Agent, or Firm—Stephen E. Revis

[57] ABSTRACT

A hydrotreating catalyst is regenerated as it concurrently hydrotreats a hydrocarbon fuel by introducing a low concentration of oxygen into the catalyst bed either continuously or periodically. At low oxygen concentrations the carbon deposits on the catalyst are burned off without harming the catalyst and without significantly affecting the hydrotreating process. In a preferred embodiment the hydrotreating process is hydrodesulfurization, and regenerating is done periodically with oxygen concentrations between 0.1 and 0.5 volume percent.

10 Claims, 2 Drawing Figures

ON-LINE REGENERATION OF HYDRODESULFURIZATION CATALYST

The Government has rights in this invention pursuant to Contract No. EX-77-C-03-1471 awarded by the Department of Energy.

BACKGROUND OF THE INVENTION

1. Field of the Invention

This invention relates to hydrotreating hydrocarbon feedstock, and more particularly to regenerating hydrotreating catalyst.

2. Description of the Prior Art

In a hydrocarbon conversion system, such as for converting natural gas or fuel oil to hydrogen for use in a fuel cell or elsewhere, any sulfur in the hydrocarbon feedstock must usually be reduced to extremely low levels. For example, in fuel cell power plants wherein a hydrocarbon fuel is steam reformed to produce hydrogen for the fuel cells, economic considerations relative to the life and performance of the steam reform reactor catalyst make it desirable to reduce the sulfur content of the fuel fed into the reactor to less than one part per million.

In a typical system a steam reforming reactor is preceded upstream by a hydrodesulfurizer (HDS). The sulfur bearing hydrocarbon fuel and a small amount of hydrogen (usually bled from a point downstream of the reform reactor) is introduced into the HDS. In the HDS organic sulfur in the fuel combines with the hydrogen in the presence of, for example, sulfided nickel and sulfided molybdenum catalyst to form $H_2S$ plus a harmless hydrogenated organic analog in accordance with the following equation:

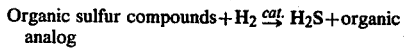

The effluent from the HDS is then introduced into hydrogen sulfide removal means, such as a bed of zinc oxide and/or charcoal which absorbs the hydrogen sulfide. The cleaned fuel may now be used in the reactor. Commonly owned U.S. Pat. Nos. 3,476,534 Buswell et al and U.S. Pat. No. 3,480,417 Setzer describe other fuel cell systems with sulfur removal means.

It is well known that hydrotreating catalysts, such as the sulfided nickel and sulfided molybdenum catalyst of the HDS discussed above, become deactivated with time by the accumulation of carbonaceous deposits. In the prior art it is common practice to regenerate the catalyst after it has accumulated carbon deposits amounting to several percent by weight of the catalyst. Known regeneration processes all have one important feature in common: regeneration is accomplished off line. Regenerating off line is expensive, but according to the prior art it has apparently been unavoidable.

In U.S. Pat. No. 4,033,898 a hydrocarbon conversion system is shut down (i.e., off line) while the hydrocarbon conversion catalysts are regenerated in situ. This involves purging the system of volatile-hydrocarbons using an inert gas, and then passing a gas containing from about 0.1 to about 2.0 volume percent oxygen through the bed of catalyst while maintaining the temperature between about 500° F. and 1000° F. for a sufficient time to burn off the carbonaceous deposits to the extent of reducing the carbon content of the catalyst to about 0.1 weight percent or less. The system is then again purged with an inert gas before putting the catalyst back on line. Other regeneration methods practiced in situ but during reactor shutdown are described in U.S. Pat. Nos. 2,934,493 and 3,966,587.

U.S. Pat. Nos. 4,026,821 and 4,038,209 describe a method and apparatus for regenerating nickel and molybdenum catalysts supported on alumina. The spent catalyst which has been contaminated with carbonaceous deposits as the result of being used in a refining process is removed from the refining apparatus, wetted with water, and then contacted with a free oxygen containing gas at a temperature in the range of 300° F. to 600° F. for a time sufficient to evaporate substantially all of the water from the catalyst surface before contacting the catalyst with a free oxygen-containing gas at a sufficiently elevated temperature to cause combustion of the carbonaceous deposits on the catalyst surface. The oxygen content of the regenerating gas may vary from below one volume percent to above twenty percent. Other regeneration techniques which use regenerators separate from the primary reaction apparatus are described in U.S. Pat. Nos. 3,041,290; 3,219,587; and 3,235,511.

SUMMARY OF THE INVENTION

One object of the present invention is a method for regenerating hydrotreating catalyst.

Another object of the present invention is a regeneration process which does not require a regeneration zone separate from the hydrotreating zone.

A further object of the present invention is a regeneration process which does not require shutting down the hydrotreating process.

Accordingly, a hydrotreating catalyst is concurrently regenerated in situ and used to hydrotreat a stream comprising a hydrocarbon feedstock and hydrogen by introducing a small amount of oxygen into the catalyst bed along with the stream.

Surprisingly, under these conditions the oxygen reacts with any carbon deposited on the catalyst forming carbon dioxide, rather than reacting with the hydrogen in the stream to form water. The present invention can be practiced using either pure oxygen or, preferably, air to provide the oxygen. We prefer to add small amounts of air on a periodic basis to remove the carbonaceous deposits which build up during the periods when the air is not being added. It is possible, however, to instead add even smaller amounts of air on a continuous basis. The air or oxygen may be added to the feedstock/hydrogen stream upstream of the catalyst bed, or it may be injected at the inlet or over the entire length of the catalyst bed, the latter alternative being for the purpose of providing a more uniform distribution of oxygen within the bed.

The temperature of the stream being treated should, of course, be maintained at least high enough to obtain reasonable activity in the catalyst bed; but it should not be high enough to result in excessive decay of the catalyst. For hydrodesulfurization the outside temperature limits within the catalyst bed are about 177° C. to 426° C.

The oxygen concentration should be high enough to remove the carbonaceous deposits at least as fast as they are being formed; but the concentration should not be so high as to damage the catalyst or interfere with the hydrotreating reaction. For example, too high an oxygen concentration can cause an excessive temperature increase in the catalyst bed. A 3% concentration, by volume, is probably the maximum which could be reasonably tolerated even for a short period of time. Less than 1% is preferred.

Although in our preferred embodiment, hereinafter to be described, the hydrotreating catalyst is supported sulfided nickel and sulfided molybdenum, it is expected that any catalysts containing metals of Groups VIb, VIIb, and VIII of the Periodic Table, such as cobalt, nickel, tungsten, molybdenum, or mixtures of two or more of these metals supported on a conventional support such as alumina, and which are commonly employed in hydrodesulfurization of various petroleum streams, hydrodenitrofication of such streams and in hydrocracking high boiling petroleum streams which are previously treated to reduce sulfur and nitrogen content, may all be regenerated according to the present method.

The major feature of the present invention is the fact that the hydrotreating operation continues uninterrupted as the hydrotreating catalyst is being regenerated, a feat which has heretofore not been accomplished.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
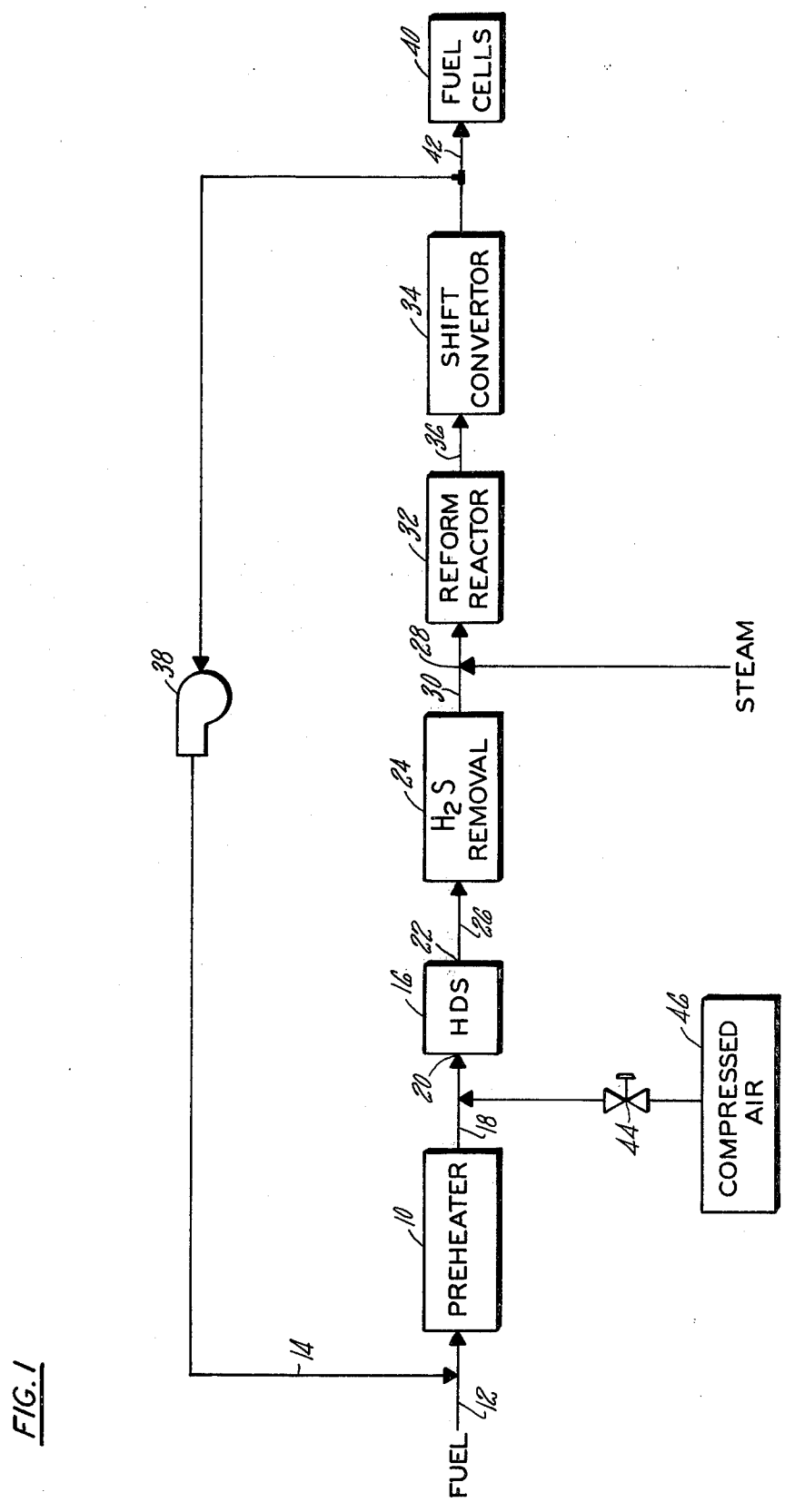
FIG. 1 is a block diagram of a fuel cell system adapted to the practice of the instant process.

Referring to the drawing, a sulfur bearing fuel, such as natural gas is introduced into a preheater 10 via a conduit 12 along with hydrogen which has been added thereto from a conduit 14. In the preheater the mixture is raised to a temperature of between 177° C. and 426° C. The heated mixture from the preheater 10 is introduced into a hydrodesulfurizer 16 via a conduit 18 for the purpose of converting the sulfur in the natural gas to hydrogen sulfide. In our preferred embodiment the hydrodesulfurization catalyst is nickel subsulfide ($Ni_3S_2$) and molybdenum disulfide ($MoS_2$) supported on alumina. This catalyst can operate at temperatures anywhere between 177° C. and 426° C. with a range of 232° C.-343° C. being preferred.

The effluent from the hydrodesulfurizer is introduced into a hydrogen sulfide removal device 24 via a conduit 26. The virtually sulfur free effluent from the hydrogen sulfide removal device is combined with steam at 28 in conduit 30; and the steam and sulfur free fuel is thereupon steam reformed by well known means in a reform reactor 32. Effluent from the reactor 32 is introduced into a shift converter 34 via a conduit 36. In the shift converter 34 the well known shift conversion reaction converts carbon monoxide in the reform reactor effluent to additional hydrogen plus carbon dioxide. A recycle blower 38 in the conduit 14 (or any other suitable means) pumps a portion of the shift converter effluent to the conduit 12 for the purpose of providing the hydrogen for the hydrodesulfurizer reaction. The shift converter effluent which is not recycled is sent to the fuel cells 40 via a conduit 42. The amount of hydrogen recycled is determined by the needs of the hydrodesulfurization reaction.

As the foregoing operation proceeds a carbonaceous deposit builds up on the hydrodesulfurization catalyst and the activity of the catalyst declines. After an appropriate period of time which is suited to the requirements of a particular system, a valve 44 is opened to admit compressed air from a source 46 into the conduit 18 whereupon it enters the hydrodesulfurizer along with the fuel and hydrogen. The oxygen in the air removes the carbon deposited on the catalyst by oxidation to carbon oxides thereby affecting regeneration of the catalyst. The valve 44 is thereupon closed until such time as regeneration of the catalyst is again desired.

The valve 44 remains open at least until the carbon deposits have been reduced to an acceptable level. Preferably the valve remains open until the temperature in the hydrodesulfurizer is no longer increasing and most preferably until the temperature begins to decline toward normal HDS operating temperatures, which means that the carbonaceous deposits are essentially completely removed. This length of time will, of course, depend upon how often the air is added and how much air is added. If oxygen continues to be added after the carbon is removed, oxidation of the catalyst itself may occur, and in any event hydrogen is burned which is wasteful since hydrogen is the end product. As heretofore mentioned, too much oxygen can adversely affect the hydrodesulfurization reaction by causing too great a temperature increase such that the catalyst is damaged or the normal hydrodesulfurization reaction is interfered with, thus temporarily allowing unreacted organic sulfur compounds to pass through the reactor.

It is possible to continuously regenerate the catalyst by providing a continuous flow of oxygen at very low concentrations, such as 0.01% or less by volume oxygen concentration based on the dry gas volume passing through the hydrodesulfurizer. It is preferred, however, to add a somewhat higher concentration of oxygen on a periodic basis. It is believed that, on a periodic basis and under certain limited circumstances up to about a 3% oxygen concentration may be used. It is preferred, however, to use a concentration of between 0.1% and 1.0% oxygen and most preferably between 0.1% and 0.5% oxygen. Air is the preferred source of oxygen, but pure oxygen may be used.

Figure 2:
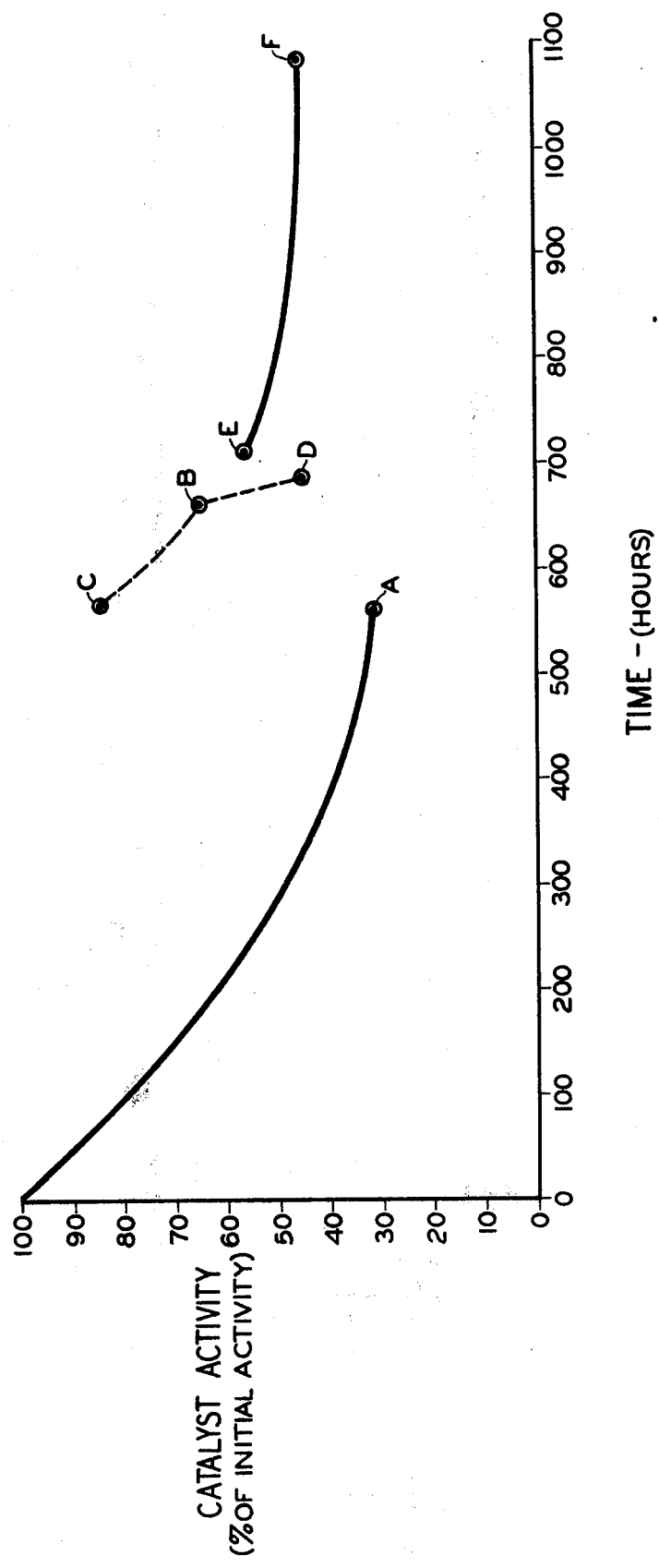
FIG. 2 is a graph showing the effects of regenerating a hydrodesulfurization catalyst by the method of the present invention.

Referring to FIG. 2, in one test 100 parts, by weight, natural gas (including 100 ppm, by volume, thiophene) was combined with 34.8 parts shift converter effluent, preheated to 232° C. in the preheater 10, and treated in a bed of supported $Ni_3S_2$ and $MoS_2$ catalyst in the HDS 16. The shift converter effluent, on a dry weight basis, is approximately 15.5% hydrogen, 80.2% carbon dioxide and 4.3% carbon monoxide. After a period of 560 hours (Point A) the catalyst activity was only 32% of its initial activity. At this point air at a rate sufficient to provide an oxygen concentration on a dry gas volume basis of 0.24% was added to the preheater effluent for a period of 1.5 hours. Although no activity measurement was made immediately after regeneration, it is estimated the activity increased from 32% (Point A) to 85% (Point C). After the air was turned off the apparatus was run for an additional 98.5 hours. At the end of this time (Point B) the catalyst activity was measured and determined to be about 65% of its original activity. Between 660 and 683 hours the temperature was varied from a low of 232° C. to a high of 326° C. The activity at the end of this period (Point D) was measured to be about 45% of the original activity. The temperature was then maintained constant at 232° C. for about 17 hours. The catalyst bed was then regenerated for a second time at an oxygen concentration of 0.24% for two hours. Its activity shortly after regeneration (Point E at 710 hours) was measured to be about 56%. The apparatus was then run for an additional 384 hours under the same conditions as the first 560 hours except that the natural gas did not include any thiophene. The catalyst activity at the end of this period (Point F) was about 45%. Note that this activity is the same activity that the catalyst had after a period of 350 hours operation; however, the catalyst by this time had accumulated over 1000 hours of operation. Also, during the period of regeneration no adverse effect on the catalyst was observed; and the effluent from the $H_2S$ removal device continued to be virtually sulfur free.

The foregoing example is only for the purpose of showing the effectiveness of the method of the present invention in terms of its ability to regenerate and hydrodesulfurize concurrently in the same catalyst bed with no adverse effects. For commercial operations the period of time between regenerations will probably be determined by an arbitrary maximum permissible amount of carbonaceous buildup. On the other hand, since after each regeneration the catalyst does not recover the level of activity it had immediately subsequent to the prior regeneration, it may be desirable or even necessary to regenerate more frequently as the catalyst ages from use.

Although in this preferred embodiment all the air is added to the fuel and hydrogen stream upstream of the hydrodesulfurizer, it is certainly possible and in certain instances may be preferable to instead introduce the air in varying amounts over the length of the hydrodesulfurizer catalyst bed.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In a method for hydrodesulfurizing a stream comprising a hydrocarbon feedstock and hydrogen by passing said stream through a bed of hydrodesulfurizing catalyst wherein carbon is deposited on said catalyst during the hydrodesulfurizing process and reduces the activity of the catalyst, the steps of preheating the incoming stream to between 232° C. and 343° C. and periodically introducing between 0.1 and 1.0 volume percent oxygen, on a dry gas basis of said stream, into the catalyst bed along with said stream to react said oxygen with the deposited carbon, without significantly affecting the hydrodesulfurizing reaction or harming the catalyst, to reduce the carbon deposits on said catalyst to an acceptable level.

2. The method according to claim 1 wherein air is introduced into said catalyst bed to provide said volume percent oxygen.

3. The method according to claim 1 wherein the catalyst is supported sulfided mickel and sulfided molybdenum.

4. The method according to claim 3 wherein the oxygen is introduced in an amount between 0.1 and 0.5 volume percent based on said stream.

5. The method according to claim 1 or 3 wherein the feedstock is a gas.

6. The method according to claim 5 wherein the feedstock is natural gas.

7. In a method for hydrodesulfurizing a stream comprising a hydrocarbon feedstock and hydrogen by passing said stream at a temperature of between 232° C. and 343° C. through a bed of hydrodesulfurizing catalyst wherein carbon tends to be deposited on the catalyst, the step of removing the carbon deposits as fast as they are forming without significantly affecting the hydrodesulfurizing process or harming the catalyst by introducing oxygen continuously into the catalyst bed along with said stream in an amount not exceeding about 0.01 dry gas volume percent based on said stream.

8. The method according to claim 7 wherein the catalyst is supported sulfided nickel and sulfided molybdenum.

9. The method according to claim 7 or 8 wherein the feedstock is a gas.

10. The method according to claim 9 wherein the feedstock is natural gas.

* * * * *

UNITED STATES PATENT AND TRADEMARK OFFICE
CERTIFICATE OF CORRECTION

PATENT NO. : 4,202,865
DATED : May 13, 1980
INVENTOR(S) : JOHN LAWRENCE PRESTON, JR.

It is certified that error appears in the above-identified patent and that said Letters Patent are hereby corrected as shown below:

Column 1, line 36,
"Organic sulfur compounds + $H_2 \xrightarrow{cat.} H_2S$ + organic analog"

should read

--Organic sulfur compounds + $H_2 \xrightarrow{cat.} H_2S$ + organic analog--

Signed and Sealed this

Fifteenth Day of July 1980

[SEAL]

Attest:

SIDNEY A. DIAMOND

Attesting Officer

Commissioner of Patents and Trademarks